United States Patent
Yamada et al.

(10) Patent No.: US 9,980,157 B2
(45) Date of Patent: May 22, 2018

(54) TRANSFER MODULE, SENSOR NETWORK SYSTEM, INFORMATION TRANSFER NETWORK SYSTEM, AND INFORMATION TRANSFER METHOD

(71) Applicant: OMRON Corporation, Kyoto-shi, Kyoto (JP)

(72) Inventors: Ryota Yamada, Kyoto (JP); Hajime Umeki, Kyoto (JP); Yusuke Yamaji, Nara (JP); Yui Ishida, Osaka (JP)

(73) Assignee: OMRON Corporation, Kyoto (JP)

( * ) Notice: Subject to any disclaimer, the term of this patent is extended or adjusted under 35 U.S.C. 154(b) by 0 days. days.

(21) Appl. No.: 14/914,807

(22) PCT Filed: Feb. 25, 2014

(86) PCT No.: PCT/JP2014/054474
§ 371 (c)(1),
(2) Date: Feb. 26, 2016

(87) PCT Pub. No.: WO2015/037254
PCT Pub. Date: Mar. 19, 2015

(65) Prior Publication Data
US 2016/0219442 A1    Jul. 28, 2016

(30) Foreign Application Priority Data

Sep. 13, 2013    (JP) ................................. 2013-190501

(51) Int. Cl.
*H04W 4/00* (2018.01)
*H04W 24/02* (2009.01)
(Continued)

(52) U.S. Cl.
CPC ........... *H04W 24/02* (2013.01); *H04W 40/22* (2013.01); *H04W 40/246* (2013.01);
(Continued)

(58) Field of Classification Search
CPC ..... H04W 24/00; H04W 28/04; H04W 40/22; H04W 24/02; H04W 24/08; H04L 67/306; H04L 29/06
(Continued)

(56) References Cited

U.S. PATENT DOCUMENTS

| 715,550 | A | * | 12/1902 | Hirano | ...................... B43L 7/14 |
| | | | | | 33/480 |
| 5,464,024 | A | * | 11/1995 | Mills | ...................... A61B 46/00 |
| | | | | | 128/849 |
| 2015/0073581 | A1 | * | 3/2015 | Cha | ........................ H05K 3/00 |
| | | | | | 700/121 |

FOREIGN PATENT DOCUMENTS

| EP | 2595432 A1 | 5/2013 |
| JP | 2007-274068 A | 10/2007 |
| JP | 2010-283587 A | 12/2010 |

OTHER PUBLICATIONS

Extended European Search Report issued in corresponding European Application No. 14844737.8, dated May 11, 2017 (6 pages).
(Continued)

*Primary Examiner* — Chi H Pham
*Assistant Examiner* — Alexander O Boakye
(74) *Attorney, Agent, or Firm* — Osha Liang LLP

(57) ABSTRACT

A transfer module transfers transmission target information on a predetermined transfer path including an information processing apparatus. This target transfer module appends transfer environment information indicating a degree of influence placed by the target transfer module on an information transfer result of the transmission target information transferred to the information processing apparatus and including at least one of module internal information about a transfer environment for the transmission target information in the transfer module or module surrounding information about a transfer environment associated with a sur-
(Continued)

rounding of the target transfer module excluding an upstream transfer module to predetermined transmission information including the transmission target information received from the upstream transfer module to generate new predetermined transmission information, and transmits the new predetermined transmission information to a downstream transfer module.

18 Claims, 9 Drawing Sheets

(51) Int. Cl.
*H04W 40/22* (2009.01)
*H04W 40/24* (2009.01)
*H04W 84/18* (2009.01)

(52) U.S. Cl.
CPC .............. *H04W 84/18* (2013.01); *Y02D 70/00* (2018.01); *Y02D 70/144* (2018.01); *Y02D 70/166* (2018.01); *Y02D 70/39* (2018.01)

(58) Field of Classification Search
USPC ........................................................ 370/329
See application file for complete search history.

(56) References Cited

OTHER PUBLICATIONS

Yunyue Lin et al.; "Energy-Conserving Dynamic Routing in Multi-Sink Heterogeneous Sensor Networks"; 2010 International Conference on Communications and Mobile Computing, IEEE; pp. 269-273; Apr. 2010 (5 pages).

International Search Report issued in PCT/JP2014/054474 dated Apr. 15, 2014 (2 pages).

* cited by examiner

FIG. 4

| Channel | 0 | 1 | 2 | 3 | 4 |
|---|---|---|---|---|---|
| Center frequency (MHz) | 920.7 | 921.1 | 921.5 | 921.9 | 922.3 |
| Noise signal intensity | BE | BE | BE | BE | BE |

| Channel | 5 | 6 | 7 | 8 | 9 |
|---|---|---|---|---|---|
| Center frequency (MHz) | 922.7 | 923.1 | 923.5 | 923.9 | 924.3 |
| RSSI | BE | BE | BE | BE | BE |

| Channel | 10 | 11 | 12 | 13 | 14 |
|---|---|---|---|---|---|
| Center frequency (MHz) | 924.7 | 925.1 | 925.5 | 925.9 | 926.3 |
| RSSI | BE | BE | C3 | BE | BE |

| Channel | 15 | 16 | 17 |
|---|---|---|---|
| Center frequency (MHz) | 926.7 | 927.1 | 927.5 |
| RSSI | BE | BE | BE |

FIG. 7 mdf {
A5:A5:A5:02:02:00:01:02:50:01:00:11:11:22:33:44:55:66:77:88:99:00:AA:BB
   a1     a2    a3                    a4

:CC:DD:EE:FF:F8:A5:A5:A5:03:
         a5
} adf1 {
A5:A5:A5:05:02:50:01:00:2E:02:00:00:00:0B:02:94:B4:52:00:00:00:0B:02:94
   b1    b2    b3          c1                c2

:B4:8A:00:00:0A:12:00:20:00:01:00:BE:BE:BE:BE:BE:BE:BE:BE:BE:BE:BE:
  c3          c4              c5

BE:BE:BE:BE:BE:BE:BE:0A:07:A5:A5:A5:04:
              c6  b5    b6
} adf2 {
A5:A5:A5:05:02:30:01:00:2E:02:00:00:00:0B:01:74:4A:4A:00:00:00:0B:01:74:
   b1    b2    b3          c1                c2

4A:81:00:00:0A:12:00:20:00:03:D7:BE:BE:BE:BE:BE:BE:BE:BE:BE:BE:B
  c3          c4              c5

E:C3:BE:BE:BE:BE:BE:0A:A7:A5:A5:A5:04
            c6  b5    b6
} adf3 {
A5:A5:A5:05:02:20:01:00:2E:02:00:00:00:0B:02:78:A8:59:00:00:00:0B:02:78:
   b1    b2    b3          c1                c2

A8:90:00:00:0A:12:00:20:00:04:E2:BE:BE:BE:BE:BE:BE:BE:BE:BE:BE:B
  c3          c4              c5

E:D1:BE:BE:BE:BE:BE:0A:A3:A5:A5:A5:04:
            c6  b5    b6
}

TRANSFER MODULE, SENSOR NETWORK SYSTEM, INFORMATION TRANSFER NETWORK SYSTEM, AND INFORMATION TRANSFER METHOD

TECHNICAL FIELD

The present invention relates to a transfer module that transfers information about an information processing apparatus on a predetermined transfer path including the information processing apparatus, and to a network system including the transfer module and the information processing apparatus.

BACKGROUND ART

Techniques have been developed to collect many sets of measurement information by measuring environmental parameters such as temperature and humidity using a sensor module and transmitting the measurement information to an information processing apparatus through a network. The sensor module has the wireless function and constructs a wireless network for transmitting the measurement information. The wireless network constructed using the sensor module enables efficient collection of information. As one such example, a wireless sensor network described in Patent Literature 1 includes a node for transmitting sensing data obtained by a sensor, a router for relaying the data, and a base for receiving the data from the router. In this network, the node appends path information to the sensing data, and the router regularly transmits information about its existence after appending the path information to the existence information. Through the network constructed in this manner, the base that receives information is further provided with the path information together with the sensing data. In this network, the state of the router can be obtained easily.

Another technique described in Patent Literature 2 reduces the load placed on a master device when a transfer path is constructed in a network involving broadcast communications. With this technique, a slave device, which intends to connect to the network, performs broadcast communications and receives a response from another slave device arranged in the surrounding. The slave device intending to connect to the network uses the content of the response data or the intensity of a magnetic field during reception of the response data to determine a communication path to be used, and stores the determined path information. In this case, the master device has no need to store information about the entire network, and thus has less load.

CITATION LIST

Patent Literature

Patent Literature 1: Japanese Unexamined Patent Application Publication No. 2010-283587
Patent Literature 2: Japanese Unexamined Patent Application Publication No. 2007-274068

SUMMARY OF THE INVENTION

Problems to be Solved by the Invention

In a network to transfer transmission target information to its destination via a plurality of relays, the transfer environment of each relay or of its surrounding may not always be appropriate for information transfer. This situation may be due to various factors. Further, the transfer environment can change with time. To achieve stable information transfer, information about the transfer environment of each relay included in the network is to be collected and analyzed sufficiently. However, this process involves a lot of work. To construct a network with relays performing wireless communications, the wireless transfer environment of each relay is measured, and each relay is set under communication conditions adjusted to improve its wireless transfer environment.

To achieve an appropriate information transfer state of the network, simply collecting information about either success or failure of communications at each relay is not enough. Collecting information about the transfer environment of each relay needs collecting information that can explain the transfer environment of each relay.

In response to this, one or more aspects of the present invention are directed to a transfer module that functions as a relay and a network system including the transfer module to efficiently collect information about the transfer environment useful for constructing a network for transferring information in a stable manner.

Means for Solving the Problem

In response to the above issue, a first aspect of the present invention provides a transfer module for transferring information to be transmitted (hereafter referred to as "transmission target information"), which is information to be processed by an information processing apparatus or information that has been processed by the information processing apparatus, on a predetermined transfer path. This transfer module (target transfer module) appends information about a transfer environment (hereafter referred to as "transfer environment information") of the target transfer module to the transmission target information, and transfers the information on the predetermined transfer path. In this case, the information received finally at the destination of the predetermined transfer path (e.g., by the information processing apparatus) includes appended transfer environment information corresponding to transfer modules that have relayed the information. The appended transfer environment information can be used to easily determine the transfer environment of each of the transfer modules that have relayed the information. In this case, a network for transferring information can be constructed in a stable manner. In the present application, the "target transfer module" refers to a transfer module included in the network. More specifically, when the target transfer module refers to a transfer module identified relative to another transfer module belonging to the network, the transfer module identified relative to the other transfer module is referred to as the "target transfer module." When another transfer module is identified relative to the target transfer module based on the flow of information within the network, another transfer module located upstream from the target transfer module is referred to as an "upstream transfer module" or similar, whereas a transfer module located downstream from the target transfer module is referred to as a "downstream transfer module" or similar. As a result, the target transfer module, the upstream transfer module, the downstream transfer module, or similar are identified based on relative relations between these transfer modules. When viewed from a different transfer module, a different transfer module is identified as a target transfer module. When the target transfer module, the upstream transfer module, and the downstream transfer module may be simply referred to as "transfer modules" when no such differentiation between them is used.

In detail, an aspect of the present invention provides a transfer module for transferring transmission target information on a predetermined transfer path including an information processing apparatus. The transmission target information is information to be processed by the information processing apparatus or information that has been processed by the information processing apparatus. The transfer module includes a reception unit, a transfer environment information obtaining unit, a generation unit, and a transmission unit. The reception unit receives predetermined transmission information including the transmission target information from an upstream transfer module located upstream from the transfer module on the predetermined transfer path. The transfer environment information obtaining unit obtains transfer environment information indicating a degree of influence placed by the transfer module on an information transfer result of the transmission target information transferred to the information processing apparatus or an information transfer result of the transmission target information transferred from the information processing apparatus. The transfer environment information includes at least one of module internal information or module surrounding information. The module internal information is information about a transfer environment for the transmission target information in the transfer module. The module surrounding information is information about a transfer environment associated with a surrounding of the transfer module excluding the upstream transfer module. The generation unit appends the transfer environment information obtained by the transfer environment information obtaining unit to the predetermined transmission information received by the reception unit to generate new predetermined transmission information. The transmission unit transmits the new predetermined transmission information generated by the generation unit to a downstream transfer module located downstream from the transfer module on the predetermined transfer path.

In the transfer module according to the aspect of the present invention, the reception unit receives information to be transmitted from the upstream transfer module, and the transmission unit transmits the information to the downstream transfer module. The transfer module thus functions as a relay on the predetermined transfer path, which is a network. The predetermined transfer path includes its starting point and its end point, and includes transfer modules functioning as relays between the starting point and end point. The predetermined transfer path according to the aspect of the present invention is not limited to a specific path. In other words, the predetermined transfer path may be a predefined path, or may be a path defined to reflect an environment for transferring information when a transfer module that has received information transmits the information to another transfer module located downstream. The information transfer by the reception unit and the transmission unit may be performed wirelessly, or may be performed with cables.

The information transferred by the transfer module is information to be processed by the information processing apparatus included in the predetermined transfer path or information that has been processed by the information processing apparatus, and is referred to as transmission target information. In the aspect of the present invention, the transmission target information may be processed in any form by the information processing apparatus. The reception unit included in the target transfer module receives predetermined transmission information including transmission target information from the upstream transfer module. The predetermined transmission information may be any information received from the upstream transfer module including the transmission target information. For example, the predetermined transmission information may be identical to the transmission target information.

In the transfer module according to the aspect of the present invention, the transfer environment information obtaining unit obtains transfer environment information associated with the target transfer module. This transfer environment information is information indicating a degree of influence placed by the target transfer module on an information transfer result of the transmission target information, or in other words, information about the transfer quality of transmission target information associated with the target transfer module. In the aspect of the present invention, the transfer environment information is roughly categorized either as information about the transfer environment formed inside the target transfer module or as information about the transfer environment formed between the target transfer module and its surrounding. The information about the transfer environment formed inside the target transfer module is information about factors inside the transfer module associated with the information transfer, such as the states of processes for the information transfer performed by the reception unit or the transmission unit in the target transfer module, or the state of power supply for the information transfer. This information corresponds to module internal information of the present invention. The information about the transfer environment formed between the target transfer module and its surrounding is information about factors between transfer modules associated with the information transfer, such as the states of processes for the information transfer performed by the reception unit or the transmission unit between the target transfer module and its surrounding. This information corresponds to module surrounding information of the present invention. Such transfer environment information is useful in determining the information transfer environment of each transfer module included in the network, because the information represents the transfer environment of each transfer module, which relays predetermined transmission information, from both the inside and the outside (surrounding) of each transfer module.

The transfer environment information obtained by the transfer environment information obtaining unit as described above is appended to the received predetermined transmission information generated by the generation unit to generate new predetermined transmission information. As a result, the new predetermined transmission information includes transfer environment information associated with the target transfer module in addition to the transmission target information intended to be transmitted. When the predetermined transmission information received by the reception unit includes appended transfer environment information associated with another transfer module via which the information has been previously transmitted, the target transfer module may append its transfer environment information in a manner superimposed on the previously appended transfer environment information, or in a manner differentiated from the previously appended transfer environment information, or in other various forms.

The new predetermined transfer information including the transfer environment information associated with the target transfer module is then transmitted by the transmission unit to the downstream transfer module. The transfer module with this structure appends information about the transfer environment of the target transfer module to predetermined transmission information when relaying the predetermined transmission information. This structure easily provides transfer environment information corresponding to at least one or all of the transfer modules that have relayed information at the destination of the predetermined transfer path. The transfer environment information associated with each transfer module is useful for constructing a network including the predetermined transfer path in an appropriate manner.

In the above transfer module, the transmission target information is information associated with measurement information obtained by a sensor for measuring a surrounding environmental parameter, and the transmission target information is measurement information to be processed by the information processing apparatus or is processed-measurement information resulting from the measurement information processed by the information processing apparatus. Thus, the transfer module according to the aspect of the present invention is also usable in an appropriate manner in collecting measurement information obtained by a sensor using a network.

More specifically, the transfer module according to the aspect of the present invention is usable in an appropriate manner in a push-based network. More specifically, the transfer module according to the aspect of the present invention is usable when the predetermined transfer path may include the sensor as a starting point and the information processing apparatus as an end point and the transfer module transfers the measurement information obtained by the sensor as a part of the predetermined transmission information. As a result, the transfer environment of each transfer module included in the predetermined transfer path can be determined easily.

The transfer module according to the aspect of the present invention is also usable in an appropriate manner in a pull-based network. More specifically, the predetermined transfer path may include a forward path including the information processing apparatus as a starting point and the sensor as an end point, and a return path including the sensor as a starting point and the information processing apparatus as an end point, and the transfer module may transmit, to a forward-path downstream transfer module located downstream from the transfer module on the forward path, information including a measurement instruction provided from the information processing apparatus to the sensor and forward-path transfer environment information appended to the information. The forward-path transfer environment information is transfer environment information obtained by the transfer environment information obtaining unit on the forward path. The transfer module may transmit, to a return-path downstream transfer module located downstream from the transfer module on the return path, new predetermined transmission information including the measurement information obtained by the sensor in response to the measurement instruction and return-path transfer environment information that is transfer environment information obtained by the transfer environment information obtaining unit on the return path appended to the measurement information, together with the forward-path transfer environment information appended on the forward path.

In this structure, a measurement instruction provided to a sensor is information to be transmitted on the forward path. The transfer environment information associated with the transfer module on the forward path is appended to the information including the measurement instruction. On the return path, the measurement information obtained by the sensor in accordance with the measurement instruction is transmission target information. The transfer environment information associated with the transfer module on the return path is appended to the information including the measurement information. As a result, the information processing apparatus, which is the destination of the predetermined transfer path, can easily determine the transfer environment of each transfer module on the forward path and on the return path, while collecting the measurement information obtained by the sensor.

When the present invention is applied to a pull-based network, the forward-path transfer environment information on the forward path and the return-path transfer environment information on the return path may be obtained in accordance with the same predetermined transfer environment criterion, and may each indicate a degree of influence placed by the transfer module on the information transfer result. When the same criterion is used to obtain transfer environment information on the forward path and the return path as described above, problems with information transfer in the pull-based network can be identified by comparing the transfer environment on the forward path and the transfer environment on the return path. As a result, a network can be constructed in an appropriate manner.

The generation unit included in the transfer module described above appends transfer environment information in the manner described below. In a first example, the generation unit may adjust a frequency of appending the transfer environment information to the predetermined transmission information received by the reception unit in accordance with the transfer environment information obtained by the transfer environment information obtaining unit or in accordance with a change history of the transfer environment information obtained by the transfer environment information obtaining unit. An ideal method to construct a network in an appropriate manner is to obtain transfer environment information associated with each transfer module included in the predetermined transfer path. In this manner, all transfer environments formed in the network can be determined with least missing information. However, appending such transfer environment information will increase the amount of information excluding transmission target information in the predetermined transmission information. This increases the transfer load on the transfer module, and may disturb smooth information transfer. Thus, the frequency of appending transfer environment information to predetermined transmission information is adjusted based on the content of the transfer environment information or its past history. This reduces the amount of generated new predetermined transmission information. For example, when the transfer environment of the transfer module is to receive no special attention, or in other words, when the information transfer is as appropriate as before, the transfer environment information may not be important. In this case, the frequency of appending this information is lowered to prevent the amount of predetermined transmission information from increasing excessively.

In a second example, the above transfer module may further include an abnormality detection unit to detect an abnormal transfer environment state that causes the transfer module to have at least a predetermined degree of influence on the information transfer result. In this case, when the abnormality detection unit detects the abnormal transfer environment state, the generation unit may append the transfer environment information to the predetermined transmission information received by the reception unit to generate the new predetermined transmission information. When the abnormality detection unit detects no abnormal transfer environment state, the generation unit may superimpose the transfer environment information associated with the transfer module on previously appended transfer environment information that is transfer environment information appended to the predetermined transmission information received by the reception unit to generate the new predetermined transmission information as one set of transfer environment information to be appended.

The abnormality detection unit detects a state including the transfer environment of the target transfer module inappropriate for constructing a network, or in other words, an abnormal transfer environment state that causes the target transfer module to have at least a predetermined degree of influence on the information transfer result. For example, when the value of a predetermined parameter included in transfer environment information is greater than a predetermined value to determine that the target transfer module cannot transmit information in an appropriate manner to its downstream transfer module, the abnormality detection unit detects the abnormal transfer environment state. The abnormal transfer environment state in the network is to be removed and the state of the network is to be recovered to an appropriate state. In this case, the transfer environment information associated with the target transfer module is useful information and is to be collected. In contrast, the network including no abnormal transfer environment state is appropriate. In this case, the transfer environment information associated with the target transfer module is less useful and may not be collected in detail.

As described above, when an abnormal transfer environment state is detected, the transfer environment information associated with the target transfer module is appended to the predetermined transmission information to generate new predetermined transmission information. This allows valuable transfer environment information to be collected with no missing information. When no abnormal transfer environment state is detected, the transfer environment information associated with the target transfer module may be superimposed on the previously appended transfer environment information into a single set of transfer environment information. This reduces the amount of transfer environment information (or the number of sets of transfer environment information) appended to predetermined transmission information to prevent the amount of predetermined transmission information from increasing excessively. The transfer environment information associated with the target transfer module may be superimposed on the previously appended transfer environment information with an appropriate technique without increasing the amount of information unnecessarily.

In a third example, the above transfer module may further include a priority determination unit that determines a priority for transfer of previously appended transfer environment information to the information processing apparatus and determines a priority for transfer of the transfer environment information associated with the transfer module to the information processing apparatus. The previously appended transfer environment information is transfer environment information that has been appended to the predetermined transmission information received by the reception unit. In this case, when the priority determination unit determines that the transfer environment information is to be transferred with a higher priority than the previously appended transfer environment information, the generation unit replaces the previously appended transfer environment information with the transfer environment information, and appends the transfer environment information to the predetermined transmission information to generate the new predetermined transmission information. When the priority determination unit determines that the transfer environment information is not to be transferred with a higher priority than the previously appended transfer environment information, the generation unit uses the predetermined transmission information to which the previously appended transfer environment information has been appended as the new predetermined transmission information without appending the transfer environment information to the predetermined transmission information.

The priority determination unit determines the priority for transferring transfer environment information to the information processing apparatus to construct a network in an appropriate manner. For example, the priority determination unit determines a higher transfer priority for information more useful for constructing a network in an appropriate manner. When the previously appended transfer environment information and the transfer environment information associated with the target transfer module have differing degrees of usefulness for constructing a network in an appropriate manner, the transfer environment information with a higher priority is appended to the predetermined transmission information as described above to generate new predetermined transmission information. This prevents the amount of predetermined transmission information from increasing excessively. A relatively small amount of predetermined transmission information indicates some transfer capacity remaining in the transfer module. In this case, the transfer environment information may not be appended in accordance with the determination result obtained by the priority determination unit. The transfer environment information associated with the transfer module that relays predetermined transmission information may be appended as needed. This allows transfer environment information on the predetermined transfer path to be collected with least missing information.

In a fourth example, the above transfer module may further include a determination unit that determines priorities for appending a plurality of sets of predetermined information included in the transfer environment information obtained by the transfer environment information obtaining unit to the predetermined transmission information. In this case, the generation unit appends at least one or all of the plurality of sets of predetermined information included in the transfer environment information to the predetermined transmission information in accordance with the priorities determined by the determination unit. To construct a network in a more appropriate manner, all the transfer environment information obtained by the transfer environment information obtaining unit is ideally appended to the predetermined transmission information. However, to prevent the amount of predetermined transmission information from increasingly excessively, information with a high priority, among a plurality of sets of predetermined information included in the transfer environment information, is appended to the predetermined transmission information as described above. This reduces the amount of predetermined transmission information, and also allows information collection for constructing a network in an appropriate manner. The priority determination may be performed by the determination unit to set a higher priority for information that seems useful for constructing a network in an appropriate manner.

In a fifth example, the above transfer module may further include a power supply detection unit that detects a power supply state for driving the transfer module. In this case, the generation unit adjusts a frequency of appending the transfer environment information to the predetermined transmission information received by the reception unit in accordance with the power supply state detected by the power supply detection unit. When the transfer module is powered by a device with a limited capacity, such as a battery, increasing the frequency of appending transfer environment information to predetermined transmission information will increase the amount of power consumption, and will limit the operable time of the transfer module and increase the maintenance frequency. However, when the transfer module is powered by a power supply with an unlimited capacity, the operation of the transfer module may not be limited based on the amount of power consumption. The frequency of appending transfer environment information to predetermined transmission information is adjusted in accordance with the power supply state as described above to control the operable time of the transfer module and to construct a network in an appropriate manner.

In the transfer module described above, the module internal information may include at least one of reception time information indicating a time at which the predetermined transmission information is received by the reception unit, obtaining time information indicating a time at which the transfer environment information is obtained by the transfer environment information obtaining unit, or transmission time information indicating a time at which the new predetermined transmission information is to be transmitted by the transmission unit. More specifically, these sets of information are time information associated with the processing performed inside the target transfer module from when the target transfer module receives predetermined transmission information to when the target transfer module transmits new predetermined transmission information to its downstream transfer module, and serve as one factor for determining the transfer environment in the network. These sets of information, if collected easily, will be used for constructing a network in a more appropriate manner.

In the transfer module described above, the reception unit may wirelessly receive the predetermined transmission information from the upstream transfer module, and the transmission unit may wirelessly transmit the new predetermined transmission information to the downstream transfer module. In other words, the present invention is applicable to a network in which information transfer is performed wirelessly between transfer modules, or the invention is applicable to a wireless network.

When the present invention is applied to a wireless network, the transfer module may include a plurality of wireless channels usable by the reception unit and the transmission unit. In this case, the transfer environment information obtaining unit includes a noise information obtaining unit that obtains, for each of the plurality of wireless channels, noise information associated with the transfer module from a surrounding. The module surrounding information includes the noise information obtained by the noise information obtaining unit. This noise information is information for each channel indicating the degree by which the wireless communications is disturbed when the target transfer module attempts to perform wireless communications with its surrounding via a plurality of wireless channels. The noise information is one factor for determining the transfer environment in the network. These sets of information, if collected easily, will be used for constructing a network in a more appropriate manner.

When the noise information is used as the module surrounding information as described above, the transfer module may further include a noise adjustment unit that adjusts timing at which the noise information is obtained by the noise information obtaining unit in accordance with the transfer frequency of the transmission target information. The noise information obtaining unit obtains noise information for each of the plurality of wireless channels, and thus may take a long time to obtain such noise information depending on the number of wireless channels. This may disturb smooth information transfer in the network. The timing to obtain noise information is adjusted in accordance with the transfer frequency of transmission target information. This allows smooth information transfer. For example, when the transfer frequency is relatively low, the influence of obtaining noise information on the information transfer is small. In this case, the noise information is obtained at timing relatively close to the timing when the generation unit generates new predetermined transmission information. This allows newer noise information to be collected. When the transfer frequency is relatively high, the influence of obtaining noise information on the information transfer is large. In this case, the noise information is obtained at timing far from the timing when the generation unit generates new predetermined transmission information. This minimizes the influence of obtaining noise information on the information transfer.

When the present invention is applied to a wireless network as described above, and noise information is used as the module surrounding information, the transfer module may further include an interference position calculation unit that calculates positional information indicating a position of an interference object interfering with wireless transfer of the transmission target information based on previously appended transfer environment information that is transfer environment information appended to the predetermined transmission information received by the reception unit and based on the module surrounding information for the target transfer module. In this case, the generation unit appends the transfer environment information and the positional information indicating the position of the interference object calculated by the interference position calculation unit to the predetermined transmission information. The interference position calculation unit can calculate the position of an interference object as a noise factor based on noise information corresponding to each wireless channel included in the previously appended transfer environment information and noise information corresponding to each wireless channel included in the transfer environment information associated with the target transfer module. In the transfer module, information about the position of an interference object calculated by the interference position calculation unit is appended to predetermined transmission information to easily determine the presence of an interference object as a factor for disturbing an appropriate network at the destination of the predetermined transfer path.

The transfer module described above may further include a module measurement sensor different from the sensor. The module measurement sensor performs measurement in the transfer module. In this case, the generation unit appends measurement information obtained by the module measurement sensor in addition to the transfer environment information to the predetermined transmission information. More specifically, the transfer module as a relay may also incorporate a sensor (module measurement sensor) for measuring a predetermined parameter. This structure can collect information for constructing a network in an appropriate manner, and can also collect measurement information using a module measurement sensor as intended by the network.

Another aspect of the present invention provides a sensor network system including a plurality of the transfer modules described above, the information processing apparatus, and the sensor.

Another aspect of the present invention provides an information transfer network system that transfers transmission target information on a predetermined transfer path including an information processing apparatus. The transmission target information is information to be processed by the information processing apparatus or information that has been processed by the information processing apparatus. In this network system, at least one of a plurality of transfer modules includes a reception unit, a transfer environment information obtaining unit, a generation unit, and a transmission unit. The reception unit receives predetermined transmission information including the transmission target information from an upstream transfer module located upstream from the at least one transfer module on the predetermined transfer path. The transfer environment information obtaining unit obtains transfer environment information indicating a degree of influence placed by the at least one transfer module on an information transfer result of the transmission target information transferred to the information processing apparatus or an information transfer result of the transmission target information transferred from the information processing apparatus. The transfer environment information includes at least one of module internal information or module surrounding information. The module internal information is information about a transfer environment for the transmission target information in the at least one transfer module. The module surrounding information is information about a transfer environment associated with a surrounding of the at least one transfer module excluding the upstream transfer module. The generation unit appends the transfer environment information obtained by the transfer environment information obtaining unit to the predetermined transmission information received by the reception unit to generate new predetermined transmission information. The transmission unit transmits the new predetermined transmission information generated by the generation unit to a downstream transfer module located downstream from the at least one transfer module on the predetermined transfer path. The technical idea disclosed in association with the transfer module of the invention may be applicable to the information transfer network system of the invention within the range not technically conflicting with each other.

In the above information transfer network system, the information processing apparatus includes an analysis unit that analyzes a factor affecting an information transfer result of the transmission target information on the predetermined transfer path based on the predetermined transmission information received from one of the transfer modules located immediately upstream from the information processing apparatus on the predetermined transfer path, and a transfer condition adjustment unit that adjusts a transfer condition in the at least one transfer module based on an analysis result obtained by the analysis unit. This structure determines factors affecting information transfer results in the network, and the transfer condition adjustment unit adjusts the transfer conditions to construct a network in a more appropriate manner. The processing performed by the transfer condition adjustment unit may be performed automatically in the information processing apparatus, and may be performed after an instruction provided from the user of the information processing apparatus is received.

Another aspect of the present invention provides an information transfer method for transferring transmission target information on a predetermined transfer path including an information processing apparatus and a transfer module. The transmission target information is transmitted via the transfer module. The transmission target information is information to be processed by an information processing apparatus or information that has been processed by the information processing apparatus. In this case, the method includes a reception step, a transfer environment information obtaining step, a generation step, and a transmission step. The reception step receives predetermined transmission information including the transmission target information from an upstream transfer module located upstream from a target transfer module on the predetermined transfer path. The transfer environment information obtaining step obtains transfer environment information indicating a degree of influence placed by the target transfer module on an information transfer result of the transmission target information transferred to the information processing apparatus or an information transfer result of the transmission target information transferred from the information processing apparatus. The transfer environment information includes at least one of module internal information or module surrounding information. The module internal information is information about a transfer environment for the transmission target information in the target transfer module. The module surrounding information is information about a transfer environment associated with a surrounding of the target transfer module excluding the upstream transfer module. The generation step appends the transfer environment information obtained in the transfer environment information obtaining step to the predetermined transmission information received in the reception step to generate new predetermined transmission information. The transmission step transmits the new predetermined transmission information generated in the generation step to a downstream transfer module located downstream from the target transfer module on the predetermined transfer path. The technical idea disclosed in association with the transfer module of the invention may be applicable to the information transfer network method of the invention within the range not technically conflicting with each other.

Another aspect of the present invention provides an information transfer program enabling a transfer module for transferring transmission target information on a predetermined transfer path including an information processing apparatus to implement an information transfer method. The transmission target information is information to be processed by the information processing apparatus or information that has been processed by the information processing apparatus. The method includes a reception step, a transfer environment information obtaining step, a generation step, and a transmission step. The reception step receives predetermined transmission information including the transmission target information from an upstream transfer module located upstream from a target transfer module on the predetermined transfer path. The transfer environment information obtaining step obtains transfer environment information indicating a degree of influence placed by the target transfer module on an information transfer result of the transmission target information transferred to the information processing apparatus or an information transfer result of the transmission target information transferred from the information processing apparatus. The transfer environment information includes at least one of module internal information or module surrounding information. The module internal information is information about a transfer environment for the transmission target information in the target transfer module. The module surrounding information is information about a transfer environment associated with a surrounding of the target transfer module excluding the upstream transfer module. The generation step appends the transfer environment information obtained in the transfer environment information obtaining step to the predetermined transmission information received in the reception step to generate new predetermined transmission information. The transmission step transmits the new predetermined transmission information generated in the generation step to a downstream transfer module located downstream from the target transfer module on the predetermined transfer path. The technical idea disclosed in association with the transfer module of the invention may be applicable to the information transfer program of the invention within the range not technically conflicting with each other.

Effect of the Invention

The transfer module functions as a relay and the network system includes the transfer module to efficiently collect information about the transfer environment that is useful for constructing a network for transferring information in a stable manner.

BRIEF DESCRIPTION OF THE DRAWINGS

FIG. 4 is a diagram showing examples of noise information that is one item of transfer environment information.

FIG. 7 shows the data content of the transmission information generated in the relay process shown in FIG. 5.

MODE FOR CARRYING OUT THE INVENTION

A network system (simply may be referred to as "system") 10 according to embodiments of the present invention and transfer modules 2 and 3 included in the system will now be described with reference to the drawings. The structures according to the embodiments described below are shown by way of example, and the present invention is not limited to these embodiments.

First Embodiment

Figure 1:
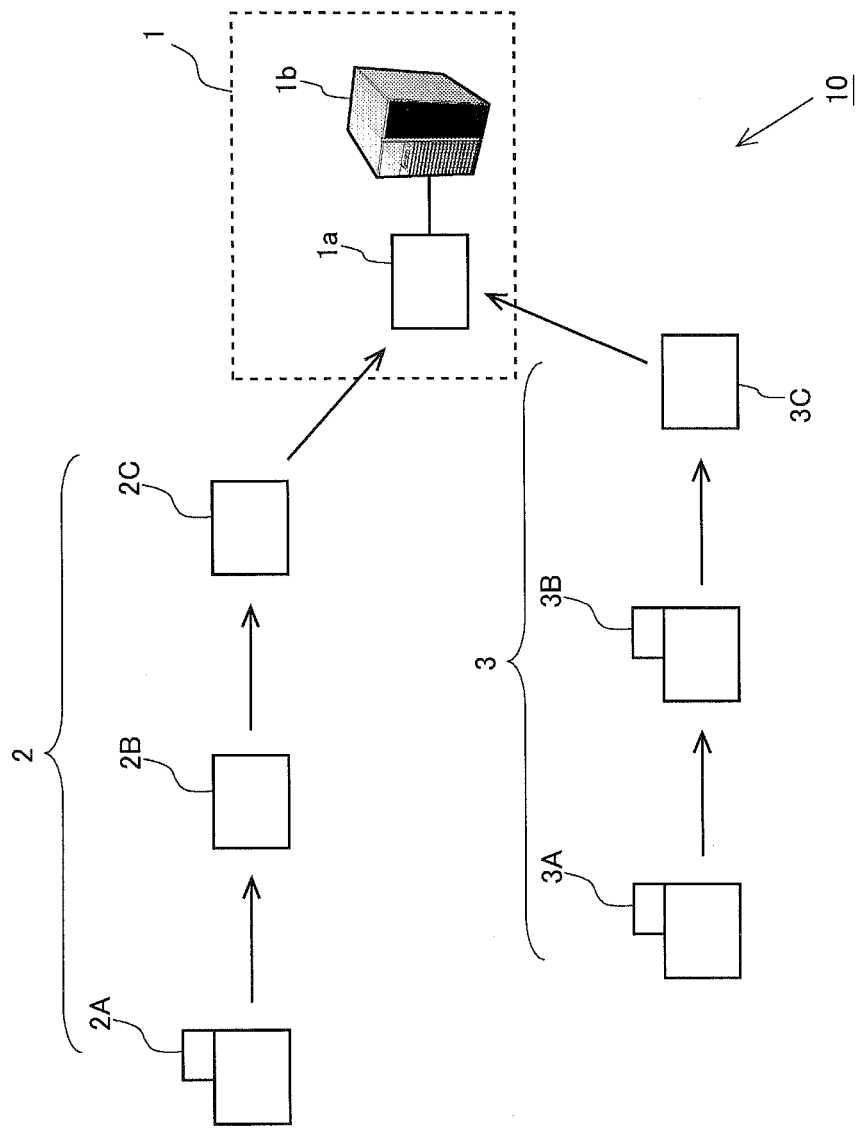
FIG. 1 is a schematic block diagram of a network system according to one embodiment of the present invention.

FIG. 1 is a schematic block diagram of the system 10. The system 10 includes transfer modules incorporating sensors for measuring various external environmental parameters (e.g., temperature, humidity, and acceleration). The system 10 has two transfer paths connecting such transfer modules and an information processing apparatus 1. The transfer modules included in the same transfer path are given the same reference numerals. When the transfer modules included in one transfer path are to be differentiated from one another, each transfer module is given a letter (A, B, etc.) for identification to follow its reference numeral 2 or 3.

More specifically, the system 10 includes a transfer path including a plurality of transfer modules 2 and a transfer path including a plurality of transfer modules 3. The first transfer path includes a transfer module 2A incorporating one of the above sensors, and transfer modules 2B and 2C having the relay function and incorporating no sensor. The second transfer path includes transfer modules 3A and 3B each incorporating one of the above sensors, and a transfer module 3C having the relay function and incorporating no sensor. In the system 10 shown in FIG. 1, the transfer modules wirelessly communicate with each other, and perform relaying in a predetermined order on each transfer path. For example, measurement information obtained by the sensor in the transfer module 2A is transferred on the transfer path including the transfer modules 2 in the order of the transfer modules 2A and 2B, and 2C, and is then finally transferred from the transfer module C to the information processing apparatus 1, which is the destination of the path.

The information processing apparatus 1 includes a transmitter-receiver 1a and a server 1b. The transmitter-receiver 1a receives information transferred from the transfer modules 2C and 3C, each of which is nearest to the information processing apparatus 1 on the corresponding transfer path. The transmitter-receiver 1a also transmits a predetermined operation command to each of the transfer modules 2C and 3C to deliver the command to the transfer modules on each transfer path. The transmitter-receiver 1a is electrically connected to the server 1b. The server 1b collects, for example, measurement information obtained by the sensors in the transfer module 2A and the transfer modules 3A and 3B to perform predetermined processing. The server 1b also collects information about the transfer environment of the transfer modules on each transfer path to analyze the transfer environment of each transfer path included in the system 10 as described below.

To allow continuous collection of information, the measurement using the sensors in the transfer module 2A and the transfer modules 3A and 3B and the transfer of the resultant measurement information to the information processing apparatus 1 are repeatedly performed at predetermined intervals (e.g., at regular intervals) after these transfer modules are powered on. Among the transfer modules 2 and 3 shown in FIG. 1, the transfer modules incorporating sensors are small devices having the sensor function of measuring an object, the function of storing and processing the resultant measurement information, the function of wirelessly communicating with devices that are external to the transfer module, and the power supply function, whereas the transfer modules without sensors are small devices having the function of wirelessly communicating with devices that are external to the transfer module and the power supply function. The transfer modules 2 and 3 have the power supply function enabled by an internal battery for supplying power to activate the functions of the modules.

The sensors incorporated in the transfer modules 2 and 3 may be, for example, physical sensors such as a temperature sensor, a humidity sensor, an illumination sensor, a flow sensor, a pressure sensor, a ground temperature sensor, and a particle sensor, or chemical sensors such as a CO2 sensor, a pH sensor, an EC sensor, and a soil moisture sensor. For ease of explanation, the transfer modules 2 and 3 in the present embodiment each incorporate only a temperature sensor for measuring the outside temperature at the positions where the transfer modules 2 and 3 are installed. The temperature data obtained by each of the transfer modules 2A, 3A, and 3B undergoes information processing performed in the server 1*b* (e.g., processing for air conditioning in a wide area where the transfer modules 2 and 3 are installed).

In the system 10, the measurement information resulting from measurement performed by a sensor is finally delivered to the information processing apparatus 1 after undergoing the relay process performed by the plurality of transfer modules. However, wireless information transfer may be affected by radio wave interference from other wireless devices outside the transfer paths, or parts of transfer modules associated with information transfer may malfunction. This may cause failures in transferring information in an appropriate manner. Thus, information about the transfer environment of a transfer module (hereafter referred to as "transfer environment information"), such as radio wave conditions at the installation site of the transfer module and the operating conditions of the transfer module at the installation site, needs to be collected and used to achieve appropriate information transfer in the entire system 10. However, such transfer environment information may depend largely on the installation site of each transfer module. The information thus needs to be obtained by performing measurement at the installation site. Collecting such transfer environment information involves a lot of work. This may cause difficulty in constructing an appropriate transfer environment in the system 10.

To allow transfer environment information to be collected easily at the installation site of each transfer module, the system 10 according to the embodiment of the present invention appends transfer environment information associated with each transfer module that performs the relay process to measurement information obtained by a sensor, which is to be transferred to the information processing apparatus 1. The transfer environment information to be appended indicates the degree of influence placed by the transfer module that performs the relay process on a transfer result of the measurement information. This enables the server 1*b* included in the information processing apparatus 1, which finally receives the measurement information, to easily determine the degree of influence placed by each of the transfer modules 2 and 3 included in the transfer paths on the transfer result in its corresponding transfer environment. As a result, the system 10 is more likely to construct an appropriate transfer environment.

Figure 2:
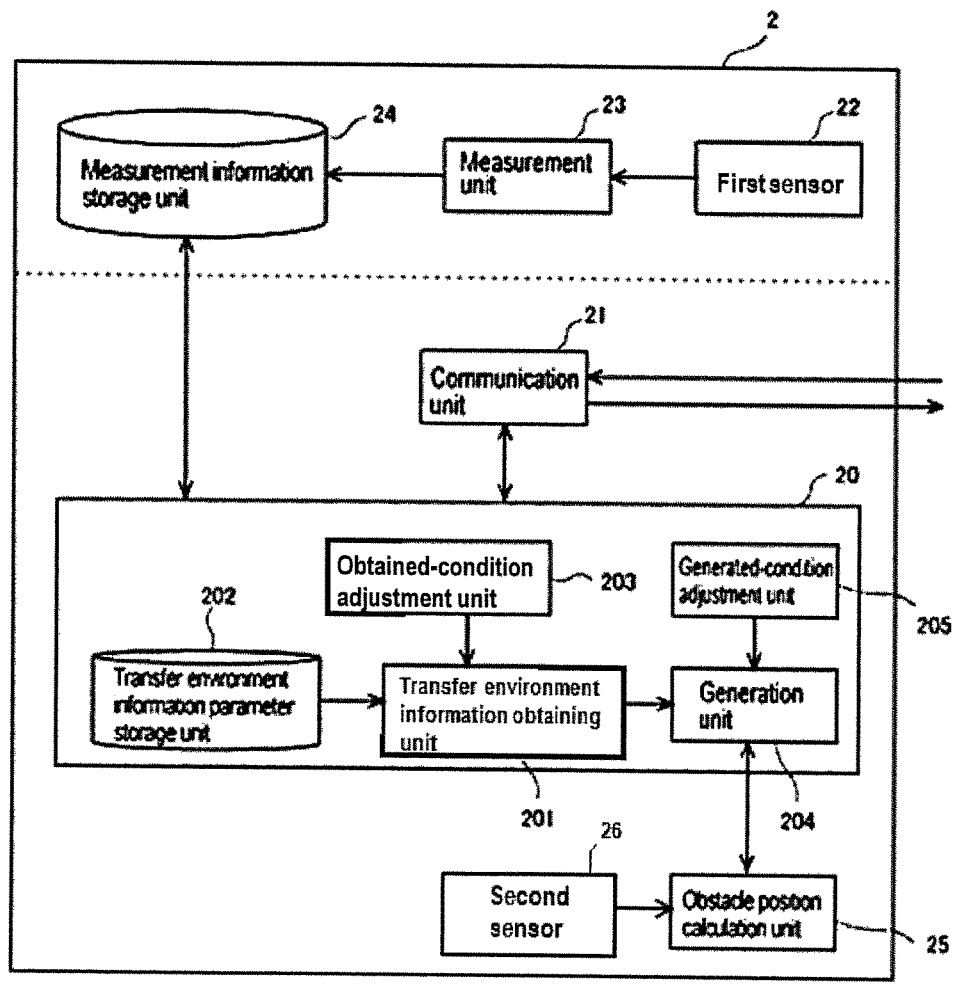
FIG. 2 is a functional block diagram of a transfer module included in the network system shown in FIG. 1.
Figure 3:
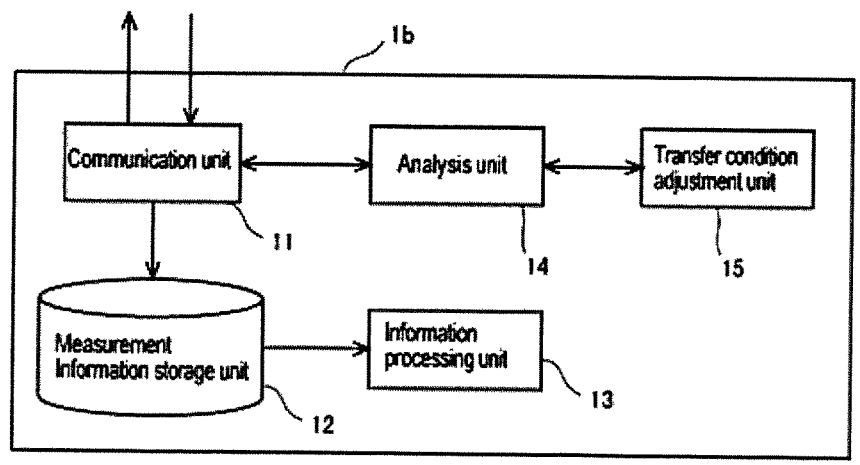
FIG. 3 is a functional block diagram of a server included in the network system shown in FIG. 1.

Based on the above, the processing performed by the transfer modules 2 and 3 and the information processing apparatus 1 included in the system 10 will now be described in detail. The transfer modules 2 and 3 each include an arithmetic unit, a memory, and other components as their internal components. The arithmetic unit executes a predetermined control program to activate various functions of the transfer module. FIG. 2 is a functional block diagram representing some of the various functions of the transfer modules 2 included in the system 10. Although FIG. 2 specifically shows the functional blocks of the transfer module 2A incorporating the sensor, the other transfer modules with sensors, or specifically the transfer modules 3A and 3B, have the same functions as the transfer module 2A. The transfer modules without sensors, or specifically the transfer modules 2B, 2C, and 3C, have the same functions as the transfer module 2A except that these transfer modules eliminate functional units associated with a sensor 22, or specifically a measurement unit 23 and a measurement information storage unit 24, which will be described below.

The transfer module 2A includes, as its functional units, a control unit 20, a communication unit 21, the measurement unit 23, the measurement information storage unit 24, and an obstacle position calculation unit 25. The transfer module 2A in the present embodiment incorporates a temperature sensor, which is the sensor 22. The functional units included in the transfer module 2A will now be described. The control unit 20 is responsible for various control executed in the transfer module 2A. The control unit 20 includes a transfer environment information obtaining unit 201, a transfer environment information parameter storage unit 202, an obtained-condition adjustment unit 203, a generation unit 204, and a generated-condition adjustment unit 205. The transfer environment information obtaining unit 201 obtains transfer environment information associated with the transfer module 2A. The transfer environment information parameter storage unit 202 stores parameters defining one or more items of transfer environment information to be obtained by the transfer environment information obtaining unit 201. The transfer environment information obtaining unit 201 thus obtains items of transfer environment information defined by the transfer environment information parameter storage unit 202. The items of transfer environment information and their detailed definitions will be described below. The obtained-condition adjustment unit 203 adjusts the conditions under which the transfer environment information obtaining unit 201 obtains the transfer environment information. More specifically, the obtained-condition adjustment unit 203 changes the timing to obtain the transfer environment information and the item of transfer environment information to be obtained.

Further, the generation unit 204 generates transmission information to be transferred to the subsequent transfer module in the transfer path that performs the subsequent relay process (corresponding to a downstream transfer module of the present invention, which is the transfer module 2B relative to the transfer module 2A). More specifically, the generation unit 204 generates transmission information to be transferred to the downstream transfer module by appending the transfer environment information associated with the transfer module 2A, which is obtained by the transfer environment information obtaining unit 201, to the measurement information obtained by the sensor 22. The mode of generating the transmission information will be described in detail later. The generated-condition adjustment unit 205 adjusts the conditions under which the generation unit 204 generates the transmission information. More specifically, the generated-condition adjustment unit 205 changes the mode of appending the transfer environment information.

The communication unit 21 communicates with devices external to the transfer module 2A, or specifically transmits and receives information to and from the external devices. More specifically, the communication unit 21 interacts with the control unit 20. The communication unit 21 is responsible for transmission and reception between the transfer module 2A and the transfer module 2B corresponding to the downstream transfer module with a wireless network. The transmission information generated by the generation unit 204 described above is transferred to the transfer module 2B.

The measurement unit 23 measures the temperature in the environment around the transfer module 2A using the temperature sensor 22. The measurement unit 23 measures the temperature in accordance with an instruction provided from the control unit 20, and the obtained temperature information is sequentially stored into the measurement information storage unit 24. The measurement information storage unit 24 interacts with the control unit 20. In accordance with an instruction provided from the control unit 20, the measurement information stored in the storage unit is provided to the control unit 20. The generation unit 204 then generates transmission information.

The obstacle position calculation unit 25 calculates the position of an obstacle in wireless communications with the transfer module 2A using the transfer environment information obtained by the transfer environment information obtaining unit 201 or the transfer environment information that has been appended to the measurement information (hereafter referred to as "previously appended transfer environment information"). The transfer module 2A is located most upstream on the transfer path as shown in FIG. 1. Although the obstacle position calculation unit 25 included in the transfer module 2A cannot use the appended transfer environment information, the obstacle position calculation unit 25 included in the transfer module 2C can use its obtained transfer environment information as well as the transfer environment information appended to measurement information by the transfer modules 2A and 2B, which are located upstream from the transfer module 2C, as the previously appended transfer environment information, and can determine the position of an obstacle based on such information. The mode of calculating the position of an obstacle will be described in detail later.

The functional units of the server 1b will now be described. The server 1b includes a communication unit 11, a measurement information storage unit 12, an information processing unit 13, an analysis unit 14, and a transfer condition adjustment unit 15. The communication unit 11 performs communications to collect transmission information from the transfer module nearest to the information processing apparatus 1 on the transfer path via the transmitter-receiver 1a. More specifically, the communication unit 11 is responsible for transmission and reception between the transfer modules 2C and 3C and the information processing apparatus 1. The measurement information storage unit 12 stores measurement information included in the transmission information transmitted from the transfer modules 2C and 3C via the communication unit 11. The measurement information stored in the measurement information storage unit 12 is transmitted to the information processing unit 13, where the information undergoes predetermined information processing (e.g., the processing for air conditioning described above) using the collected measurement information. The sensor 22 incorporated in each transfer module is a sensor for obtaining measurement information used for the predetermined information processing to be performed by the information processing unit 13.

The analysis unit 14 analyzes the factor for a transfer failure on the transfer path (the transfer path including the transfer modules 2) constructed in the system 10 based on the transfer environment information associated with the transfer modules 2A, 2B, and 2C, which have performed a relay process, appended to measurement information included in the transmission information transferred from the transfer modules 2C and 3C via the communication unit 11. The transfer condition adjustment unit 15 adjusts the transfer conditions of each transfer module on the transfer path based on the analysis result obtained by the analysis unit 14 to improve the transfer environment on the transfer path. The mode of analysis performed by the analysis unit 14 and the mode of adjustment of the transfer conditions by the transfer condition adjustment unit 15 will be described in detail later.

The transfer environment information according to the present embodiment will now be described. As described above, the transfer environment information indicates the degree of influence placed by each transfer module that performs the relay process on the result of transfer of the measurement information. For example, the transfer environment information indicates the transfer environment of each transfer module including the radio wave conditions and the operating conditions of the transfer module at its installation site. In the present embodiment, the transfer environment information is roughly categorized either as information about the transfer environment mainly formed by factors inside a transfer module (hereafter referred to as "module internal information") or as information about the transfer environment mainly formed by factors associated with communications (wireless communications in the present embodiment) with devices surrounding the target transfer module excluding its upstream transfer module (hereafter referred to as "module surrounding information"). Various items of information that belong either to the module internal information or to the module surrounding information are used as transfer environment information associated with the target transfer module. Examples of the module internal information and the module surrounding information will now be described.

Examples of module internal information associated with communication results of a transfer module include items of information described below. A communication result refers to an actual phenomenon resulting from wireless communications performed by the transfer module.

(1) Information for identifying an antenna used for communications from multiple antennas included in the communication unit 21 of the transfer module to allow diversity communications:

This item of information is used because the transfer environment for communications with an upstream transfer module or a downstream transfer module can vary depending on the antenna used for communications.

(2) The number of attempts performed to transfer one set of information during communications with an upstream transfer module or a downstream transfer module:

This item of information is used because the transfer environment and the number of attempts can correlate with each other. For example, the number of attempts for communications is smaller when the transfer environment for communications with an upstream transfer module or a downstream transfer module is relatively appropriate.

(3) The remaining battery or memory level of a transfer module:

This item of information is used because the transfer environment and the remaining battery or memory level can correlate with each other. For example, a lower level of remaining battery or memory may disturb smooth information transfer processing.

(4) The reception time at which the target transfer module receives transmission information from an upstream transfer module, and the transmission time at which the target transfer module transmits transmission information to a downstream transfer module:

For example, a difference between the reception time and the transmission time in one transfer module can be considered as the processing time taken in the transfer module. A longer processing time can represent a higher load concentrating on the transfer module. The high load can affect the transfer environment. A difference between the reception time in one transfer module and the transmission time in its upstream transfer module can also be considered as the time taken for the communications between these transfer modules. A longer communication time can reasonably imply the presence of an obstacle (an interference object) in communications between these transfer modules, which has increased the number of attempts for communications. This indicates that the obstacle can affect the transfer environment. In this manner, the reception time and transmission time are useful transfer environment information formed by factors inside the transfer module.

(5) The time at which transfer environment information is obtained:

For example, a difference between the above reception time and the time at which transfer environment information is obtained can be considered as the time taken to obtain the transfer environment information. A difference between the above transmission time and the time at which transfer environment information is obtained can be considered as the time taken by the generation unit 204 to generate transmission information (described in detail later). These are the times to be taken for more detailed processing performed in the transfer module, and are useful transfer environment information formed by factors inside in the transfer module.

Examples of module internal information other than the above information examples associated with communication results of a transfer module further include setting information for communications of the transfer module. Unlike the above information associated with communication results, the setting information normally does not vary after every transfer of information. Examples of such setting information, which is one item of module internal information, include information about the transmission power of the transfer module, the transfer rate, the channel used for information transfer, the identification number of the transfer path (network) on which the transfer module is installed, the hardware identification number uniquely assigned to the communication unit 21 of the transfer module (e.g., a media access control or MAC address), and the maximum number of attempts for communications.

Examples of module surrounding information associated with communication results of a transfer module include items of information described below.

(6) Noise information indicating the source of interference in wireless communications performed by the transfer module:

One example of such noise information is information about the intensity of reception signals (the intensity of noise signals) from the surrounding devices that emit radio waves through each communication channel, when the transfer module has multiple communication channels with different center frequencies. FIG. 4 shows noise information for 18 communication channels of the transfer module (expressed using hexadecimal numbers in FIG. 4). In the example shown in FIG. 4, the intensity of a noise signal through a channel 12 is higher than on the other channels. When the transfer module attempts to transfer information on the transfer path through the channel 12, the information transfer may interfere with radio waves from an interference source in the surrounding. In this case, the transfer module is highly likely to perform inappropriate information transfer. The noise information can be obtained using, for example, energy detection (ED) scanning compliant with IEEE 802.15.4, which is the standard of near-field wireless communications. FIG. 4 shows the measurement results obtained through ED scanning indicating the intensity of noise signals.

(7) Detection information for an obstacle found in the surrounding of the transfer module:

One example of such detection information for an obstacle includes detection results (information about the presence of an obstacle) obtained by the transfer module using a sensor 26 other than the temperature sensor 22, such as an infrared sensor or an ultrasound sensor that can detect a person or an object in the surrounding of the transfer module. In such embodiments, sensor 22 is a first sensor, and sensor 26 is a second sensor, as shown in FIG. 2. An obstacle in the surrounding of the transfer module detected by the sensor 26 can obstruct communications performed between the transfer module and its upstream transfer module or its downstream transfer module. Thus, the detection information can be useful transfer environment information formed by factors surrounding the transfer module. The direction and the gradient of a detection signal transmitted from the infrared sensor or the ultrasound sensor may also be used to detect the position and the height of an obstacle relative to the transfer module. Such information may also be useful transfer environment information formed by factors surrounding the transfer module.

In this manner, the module internal information and the module surrounding information for one transfer module can be used as transfer environment information associated with the transfer module. This provides information about the degree of influence placed by the transfer module on its transfer environment or in other words the information transfer result. A relay process in which each transfer module collects transfer environment information together with measurement information obtained by a sensor will now be described with reference to FIG. 5. The relay process is implemented by executing a predetermined control program in the transfer modules 2B and 2C; and 3B and 3C that perform the relay process among the transfer modules 2 and 3 belonging to the respective two transfer paths shown in FIG. 1. In the present embodiment, the relay process performed by the transfer module 2C will be described as a typical example. The same relay process is performed by other transfer modules for relaying.

FIGS. 6A to 6C are diagrams showing the data structure of transmission information generated by transfer modules. FIG. 6A at the top schematically shows the overall data structure of the transmission information. The transmission information is mainly divided into nine data areas. In the present embodiment, six particularly important data areas a1 to a6, among the nine data areas, will be described. The area a1 (Start Symbol) stores a particular byte string indicating the start of the transmission information. The area a2 (Destination Address) indicates the address of the final destination of the transmission information (the information processing apparatus 1 in the present embodiment). The area a3 (Source Address) indicates the address of the transmission source of the transmission information (the transfer module 2A in the present embodiment). The area a4 (Data) indicates the temperature data (corresponding to measurement information of the present invention) detected by the temperature sensor 22 incorporated in the transfer module 2A, which is the transmission source. The area a5 (Terminator Symbol for Data) stores a particular byte string indicating the end of the transmission information. The area a6 (Appended Data) indicates transfer environment information appended to the measurement information as described above.

FIG. 6B in the middle shows the detailed data structure of the area a6. FIG. 6B shows the structure of sets of transfer environment information appended by transfer modules. Each of these appended sets of transfer environment information is given letters adf. The detailed structure of the transfer environment information adf appended by the transfer module 2C will now be described by specifically describing data areas b1 to b6 included in the transfer environment information adf. The area b1 (Separator Symbol for Appended Data) stores a particular byte string indicating the start of one appended set of transfer environment information adf. The area b2 (Appended Data Source Address) indicates the address of the transfer module that has appended the transfer environment information adf (the transfer module 2C in the present embodiment). The area b3 (Appended Data ID) is an identifier for identifying the data entity of the transfer environment information for the area b4, which will be described below.

The area b4 (Appended Data Entity) indicates the data entity of the appended transfer environment information. As shown in FIG. 6C at the bottom in the present embodiment, the data entity of the transfer environment information for the area b4 includes information (Rx Time Stamp) indicating the time at which the target transfer module 2C has received the transmission information from its upstream transfer module stored in an area c1, information (Tx Time Stamp) indicating the time at which the target transfer module 2C transmits the transmission information to its downstream information processing apparatus 1 stored in an area c2, the MAC address (MAC Address) of the target transfer module 2C stored in an area c3, information (RSSI of Data Receive) indicating the intensity of the reception signal when the transmission information is received by the target transfer module 2C from its upstream transfer module 2B stored in an area c4, and noise information (ED Scan Result) generated through ED scanning described above stored in an area c5, and information (Tx Power) indicating the transmission power of the target transfer module 2C stored in an area c6.

In one set of transfer environment information adf, the area b5 stores checksum data for detecting an error in the transfer environment information adf. The area b6 stores a particular byte string indicating the end of this transfer environment information adf.

As described above, the transmission information (corresponding to predetermined transmission information of the present invention) transferred from one transfer module to another transfer module includes measurement information obtained by the temperature sensor 22 included in the transfer module 2A. In detail, the transmission information is the result of each transfer module appending its transfer environment information adf to the main information mdf in the transmission information including the measurement information. The transfer modules 2A and 3A, which are each located most upstream on the corresponding transfer path, are the transmission sources of the temperature data stored in the area a4, and thus do not actually relay information. However, the transmission information is generated by appending the transfer environment information adf associated with each of the transfer modules 2A and 3A to the main information mdf including the temperature data when the temperature data is transferred initially. In this process, the transfer modules 2A and 3A receive no transmission information from their upstream modules. In this case, the area c1 and the area c4 in the transfer environment information adf each store a null value.

Relay Process

Referring back to FIG. 5, the relay process will now be described. In step S101, the determination is performed as to whether the target transfer module 2C has received transmission information from its upstream transfer module 2B. This determination is started when the control unit 20 accesses the communication unit 21. When the determination result is affirmative in step S101, the processing advances to step S102. When the determination result is negative, the processing in step S101 is repeated.

Figure 6:
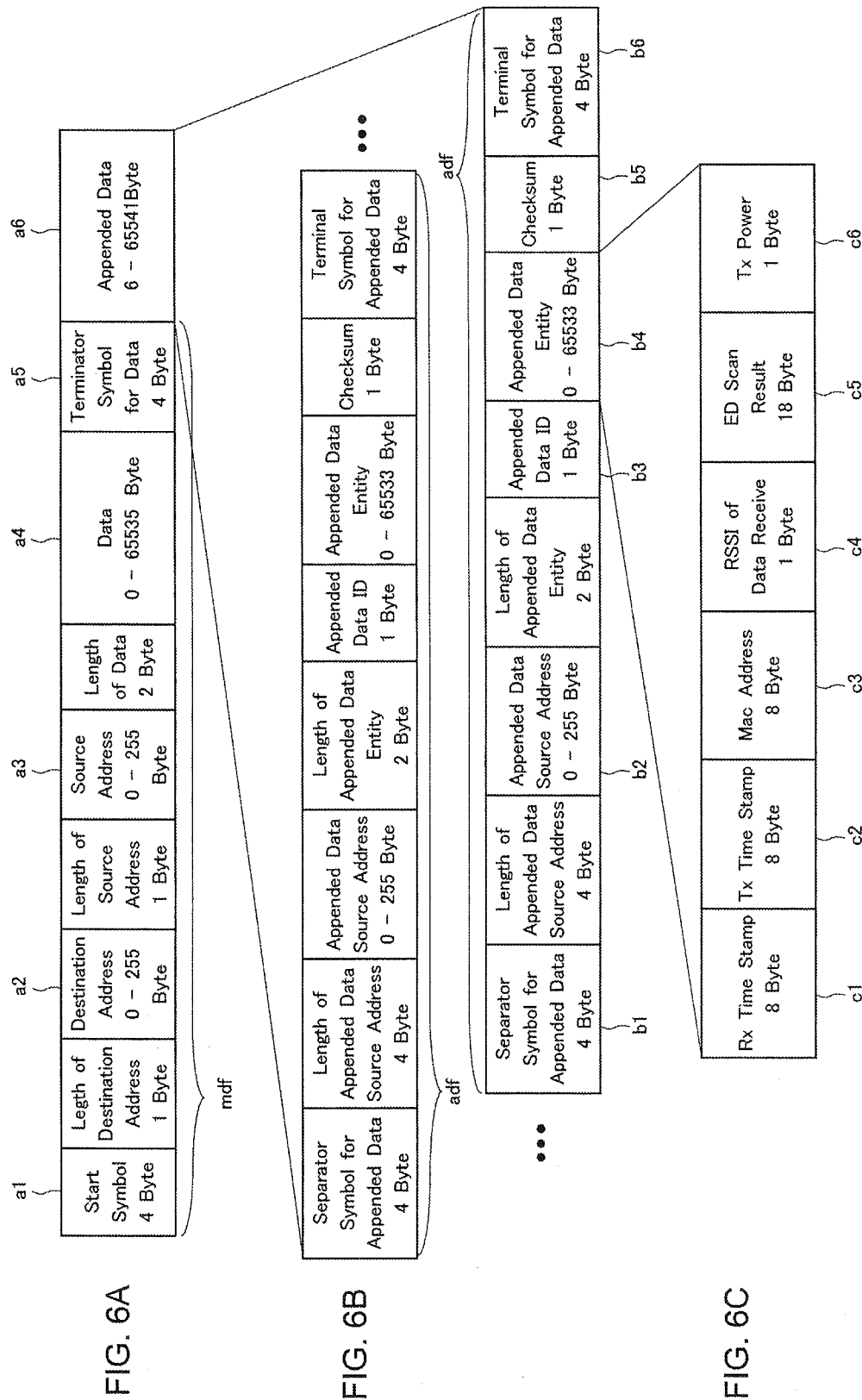
FIGS. 6A to 6C are schematic diagrams showing the data structure of transmission information generated in the relay process shown in FIG. 5.

In step S102, the transfer environment information obtaining unit 201 obtains transfer environment information associated with the transfer module 2C. As shown in FIG. 6, the transfer environment information obtaining unit 201 obtains six sets of information in the present embodiment, namely, the information indicating the time at which the transmission information has been received (Rx Time Stamp), the information indicating the time at which the transmission information is to be transmitted (Tx Time Stamp), the MAC address (MAC Address), the information indicating the intensity of the reception signal (RSSI of Data Receive), the noise information (ED Scan Result), and the information indicating the transmission power (Tx Power). Among these information sets, the information indicating the intensity of the reception signal (RSSI of Data Receive) belongs to none of the module internal information and the module surrounding information described above. However, the information indicating the intensity of the reception signal is included in the transfer environment information adf because this set of information represents the transfer environment between the transfer module 2C and the upstream transfer module 2B. When the processing in step S102 completes, the processing advances to step S103.

In step S103, the generation unit 204 generates new transmission information by appending the transfer environment information adf associated with the transfer module 2C obtained in step S102 to the transmission information received from the upstream transfer module 2B via the communication unit 21. As described above, the transfer environment information adf is appended in the area a6 of the transmission information. When the processing in step S103 completes, the processing advances to step S104, in which the generated new transmission information is transmitted downstream on the transfer path (to the information processing apparatus 1 in the present embodiment) via the communication unit 21.

Figure 5:
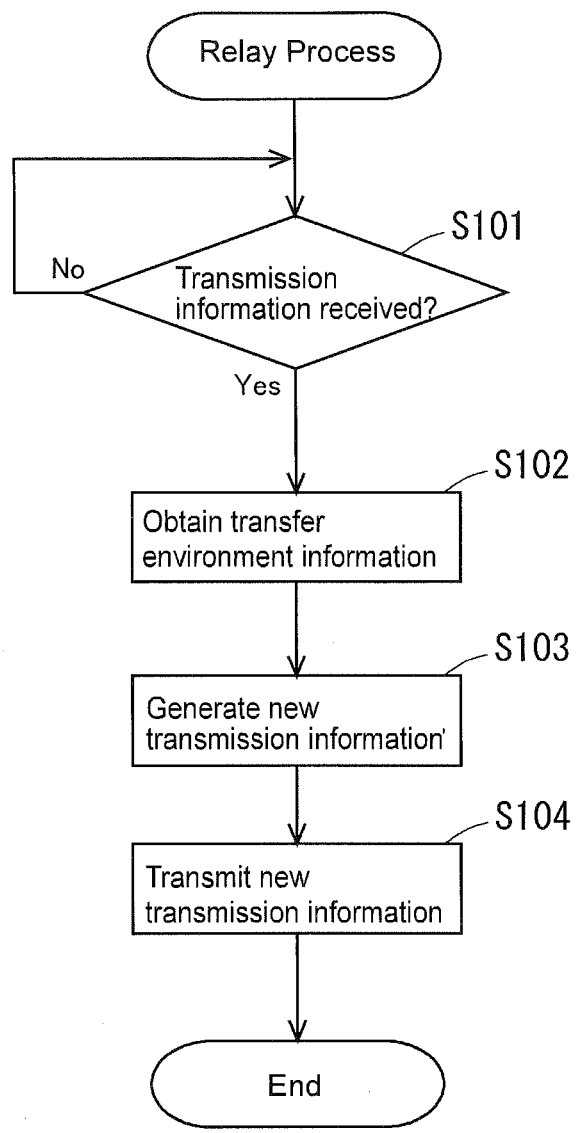
FIG. 5 is a flowchart showing a relay process for relaying transmission information performed by the transfer module shown in FIG. 2.

The relay process shown in FIG. 5 is performed by the transfer modules 2B and 2C and 3B and 3C, which relay transmission information. Each of the transfer modules 2A and 3A, which is located most upstream on the corresponding transfer path, receives no transmission information from an upstream module. Thus, the transmission information starts being transferred through each transfer path when the processing in steps S102 to S104 in the relay process in FIG. 5, excluding the processing in step S101, is performed. In step S103, the transmission information is generated by appending the transfer environment information associated with the transfer modules 2A and 3A to the measurement information obtained by the sensor (temperature data).

FIG. 7 shows the detailed structure of the transmission information newly generated in the transfer module 2C. The data areas in FIG. 7 correspond to the data areas shown in FIG. 6. In the transmission information shown in FIG. 7, the area a4 of the main information mdf stores measurement information (temperature data) obtained by the sensor 22 incorporated in the transfer module 2A, and the transfer environment information adf1 associated with the transfer module 2A is appended to the main information mdf. In addition, the transfer environment information adf2 associated with the transfer module 2B and the transfer environment information adf3 associated with the transfer module 2C are appended to the main information mdf. This completes the transmission information shown in FIG. 7. The complete transmission information is then transmitted to the server 1b included in the information processing apparatus 1.

For the transfer path including the transfer modules 3 shown in FIG. 1, the transfer module 3B that performs the relay process further incorporates the temperature sensor 22 for measuring the ambient temperature. When the transfer module 3B incorporating the temperature sensor 22 performs the relay process, measurement information obtained by the temperature sensor 22 incorporated in the transfer module 3B may be appended to the transmission information transferred from the upstream transfer module 3A (including the measurement information in the transfer module 3A), in addition to the transfer environment information associated with the transfer module 3B. In this manner, more sets of temperature data may be collected together with the transfer environment information associated with the transfer module 3B that performs the relay process.

Factor Analysis Process

Figure 8:
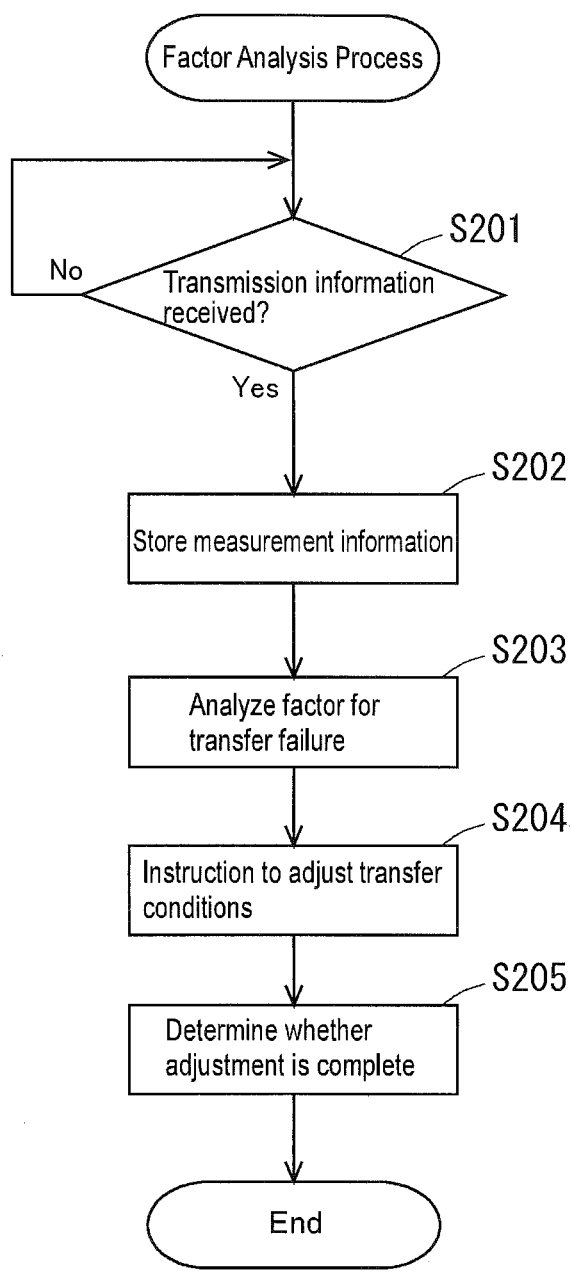
FIG. 8 is a flowchart showing a transfer failure factor analysis process performed by the server shown in FIG. 3.

Referring now to FIG. 8, a factor analysis process for analyzing factors affecting the transfer environment on a transfer path performed by the server 1b included in the information processing apparatus 1 will be described. This factor analysis process is performed based on the transmission information received by the information processing apparatus 1 through the transfer path including the transfer modules 2 shown in FIG. 1. The factor analysis process is implemented by the server 1b executing a predetermined control program.

In step S201, the determination is performed as to whether the information processing apparatus 1 has received the transmission information from its upstream transfer module 2C. When the determination result is affirmative in step S201, the processing advances to step S202. When the determination result is negative, the processing in step S201 is repeated. In step S202, the measurement information storage unit 12 stores the measurement information (information stored in the area a4 shown in FIG. 7) included in the received transmission information. Controls executed using the collected measurement information (e.g., the control for air conditioning described above) are not the gist of the invention and will not be described. When the processing in step S202 completes, the processing advances to step S203.

In step S203, the analysis unit 14 analyzes a factor causing a transfer failure on the transfer path including the transfer modules 2. For example, the analysis unit 14 analyzes the transmission information shown in FIG. 7 and compares the noise information stored in the area c5 of the transfer environment information adf1 appended by the transfer module 2A, the noise information stored in the area c5 of the transfer environment information adf2 appended by the transfer module 2B, and the noise information stored in the area c5 of the transfer environment information adf3 appended by the transfer module 2C. The analysis unit 14 determines that the channel 12 in the transfer environment information adf1 has a noise level BE, the channel 12 in the transfer environment information adf2 has a noise level C3, and the channel 12 in the transfer environment information adf3 has a noise level D1 (where D1>C3>BE). This indicates the presence of an interference object that emits radio waves interfering with the channel 12 near the transfer modules 2B and 2C, or particularly near the transfer module 2C.

In the present embodiment, the transfer environment information includes the reception time information and the transmission time information for each transfer module. As described above, such time information can be used to determine the level of a load on each transfer module and the presence of an obstacle that can lengthen the time taken for information transfer between modules. When the processing in step S203 completes, the processing advances to step S204.

In step S204, the transfer condition adjustment unit 15 adjusts the transfer conditions on the transfer path including the transfer modules 2 based on the results of the factor analysis performed in step S203. For example, when an interference object that emits radio waves interfering with the channel 12 is found near the transfer modules 2B and 2C as described above, the channel currently used for information transfer by the transfer modules 2B and 2C is switched from the channel 12 to another usable channel. When, for example, the time information implies the presence of an obstacle between the transfer modules 2B and 2C, the transfer path for transferring transmission information from the transfer module 2B may be switched from the transfer module 2C to another transfer module not shown in FIG. 1 to deliver the transmission information to the information processing apparatus 1. In step S204, the information processing apparatus 1 provides an instruction to adjust the transfer conditions to improve the transfer environment of the transfer path to relevant transfer modules. In step S205, the determination is performed as to whether the information transfer conditions have been set to reflect the instruction for adjustment provided in step S204.

In this manner, the system according to the embodiment of the present invention uses transfer environment information associated with each transfer module included in the transfer path together with measurement information, and eliminates the need for obtaining the transfer environment information at the installation site of each transfer module, and thus easily improves the transfer environment of each transfer path. In the factor analysis process shown in FIG. 8, the information processing apparatus 1 determines the position of an interference source by comparing sets of noise information included in the appended transfer environment information. In some embodiments, a transfer module may determine the position of an interference source and may append the determination result to transmission information. In this case, a transfer module may detect an interference source near the transfer module when noise information included in the transfer environment information indicates the noise level of one channel exceeding a predetermined level. In the same manner as in the information processing apparatus 1, the transfer module nearest to the information processing apparatus 1 (e.g., the transfer module 2C) may compare sets of noise information included in the transfer environment information that have been appended sequentially to the transmission information and may determine the position of an interference source. This can reduce the load on the information processing apparatus 1.

First Modification

In the above embodiment, information is wirelessly transferred between transfer modules and from a transfer module to an information processing apparatus. The transfer environment information is thus extracted as described above for wireless communications. The embodiment is also applicable to transferring information between transfer modules and from a transfer module to an information processing apparatus with cables. In this modification, the transfer environment information associated with each transfer module that performs the relay process is transferred together with measurement information in the same manner as described in the first embodiment to easily improve the transfer environment of the transfer path. Examples of the module internal information associated with communication results of a transfer module include the remaining battery or memory level of the transfer module, the reception time at which the target transfer module has received transmission information from its upstream transfer module, the transmission time at which the target transfer module transmits the transmission information to its downstream transfer module, and the time at which the transfer module has received the transfer environment information. Examples of setting information, which is one item of module internal information, include the identification number uniquely assigned to the communication unit 21 of the transfer module (e.g., a MAC address) and the maximum number of attempts for communications.

In the system including transfer modules connected with cables, detection information for an obstacle near a transfer module can be used as one item of module surrounding information associated with communication results of the transfer module when the transfer module affects the results of the information transfer.

Second Modification

In the above embodiment, the information to which the transfer environment information associated with each transfer module is appended, namely, the information intended to be transmitted to the information processing apparatus 1 is, for example, measurement information obtained by a sensor. In some embodiments, the transfer environment information associated with each transfer module may be appended to the information resulting from the measurement information processed by the information processing apparatus 1 when such processed information, instead of the measurement information, is transmitted to a predetermined destination through a plurality of transfer modules. This structure easily provides information for improving the transfer environment at the destination.

In some embodiments, the transfer environment information associated with each transfer module that performs the relay process may be appended to predetermined information other than the measurement information when the predetermined information is transferred to a destination. This structure easily provides information for improving the transfer environment at the destination in the same manner.

Second Embodiment

Figure 9:
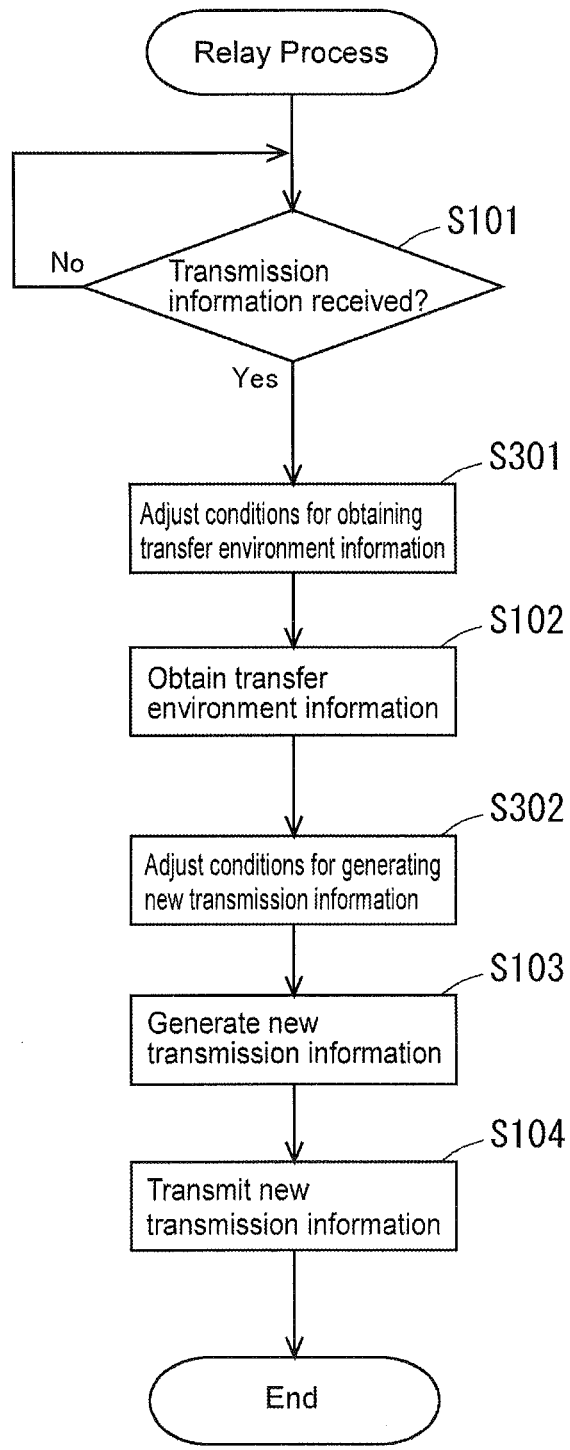
FIG. 9 is a flowchart showing a second relay process for relaying transmission information performed by the transfer module shown in FIG. 2.

A relay process performed by transfer modules according to another embodiment will now be described with reference to FIG. 9. The processing steps in FIG. 9 that are substantially the same as the processing steps in the relay process shown in FIG. 5 are given the same reference numerals as those steps, and will not be described in detail. In the relay process shown in FIG. 9, when the determination result is affirmative in step S101, the processing advances to step S301. In step S301, the obtained-condition adjustment unit 203 adjusts the conditions under which the transfer environment information is obtained by the transfer environment information obtaining unit 201. For example, the obtained-condition adjustment unit 203 adjusts the timing at which the transfer environment information obtaining unit 201 obtains noise information included in the transfer environment information in accordance with the frequency at which the transmission information including measurement information is transferred from the transfer module 2A to the information processing apparatus 1 (hereafter, simply referred to as "transfer frequency").

More specifically, the timing at which noise information is obtained is closer to the timing at which new transmission information is generated by the generation unit 204 as the transfer frequency is lower. As the transfer frequency is higher, the timing at which noise information is obtained is less close to the timing at which new transmission information is generated. In other words, noise information is obtained in advance independently of the timing when new transmission information is generated. The noise information is obtained through ED scanning performed in accordance with the number of channels. Obtaining noise information for all channels takes a relatively long time. When the transfer frequency is higher, the time taken to obtain noise information is rate-limiting. This may disturb smooth transfer of information on the transfer path. To correctly determine the transfer environment of each transfer path, the transfer environment information associated with each transfer module is to be transmitted at the timing when the transmission information is relayed. In other words, the transfer environment information may be obtained at the timing closer to the timing when new transmission information is generated by the generation unit. The timing at which noise information is obtained is thus adjusted in accordance with the transfer frequency as described above. This allows information to be transferred smoothly and also accurate transfer environment information to be obtained.

When the processing in step S301 completes, the processing advances to step S302 through step S102. In step S302, the generated-condition adjustment unit 205 adjusts the conditions under which new transmission information is generated by the generation unit 204. Five modes of adjusting the information generating conditions will now be described. The information generating conditions described below may be adjusted in a transfer module in one of the five modes selected automatically, or in a predetermined one of the five modes selected in accordance with a user instruction provided from the information processing apparatus 1.

Example 1

The frequency with which transfer environment information is appended by the generation unit 204 is adjusted based on transfer environment information obtained by the transfer environment information obtaining unit 201 or based on the change history of the transfer environment information. Although all transfer environment information obtained by the transfer environment information obtaining unit 201 may be appended to transmission information, appending all the information will excessively increase the amount of transmission information, and may disturb smooth transfer of information. Information about factors for degrading the transfer environment of a transfer path is particularly important transfer environment information. When, for example, the value of transfer environment information or the change history of transfer environment information indicates a degraded transfer environment for the transfer path, the transfer environment information is appended to the transmission information with a higher frequency to collect information useful for improving the transfer environment. When the value of transfer environment information or the change history of transfer environment information indicates no degraded transfer environment for the transfer path, the transfer environment information may seem less useful, and thus is appended to the transmission information with a lower frequency. This prevents the amount of transmission information from increasing excessively.

The value of transfer environment information is determined to indicate a degraded transfer environment for the transfer path when, for example, the noise level indicated by noise information exceeds a predetermined threshold. The change history of transfer environment information is determined to indicate a degraded transfer environment for the transfer path when, for example, the noise level indicated by the latest noise information has increased by at least a predetermined percentage from the average of the several noise level values obtained previously.

Example 2

Transfer environment information obtained by the transfer environment information obtaining unit 201 may be used to determine whether a transfer path is in an abnormal transfer environment state representing a degraded transfer environment for the transfer path. The mode of appending the transfer environment information by the generation unit 204 may be adjusted based on the 20 determination result. More specifically, when the determination result indicates that the transfer path is in an abnormal transfer environment state, the transfer environment information seems useful. In this case, the transfer environment information is appended to the transmission information in a normal manner. When the determination result indicates that the transfer path is not in an abnormal transfer environment state, the transfer environment information may not seem useful. In this case, the transfer environment information associated with this target transfer module is appended to the transmission information received from its upstream transfer module in a manner superimposed on the previously appended transfer environment information, which has been appended to the transmission information, into a single set of transfer environment information. This reduces the number of sets of transfer environment information included in the transmission information, and thus reduces the amount of transmission information delivered to the information processing apparatus 1.

One set of transfer environment information may be superimposed on another set of transfer environment information using, for example, the average of data entity of the previously appended transfer environment information and the transfer environment information associated with the target transfer module stored in the area b4 of each set of transfer environment information. The transfer path may be determined in an abnormal transfer environment state based on the value of the transfer environment information or its change history in the same manner as described in example 1.

Example 3

The previously appended transfer environment information, which is transfer environment information previously appended to the transmission information received from the upstream transfer module, may be compared with the transfer environment information associated with the target transfer module to determine the priority of transfer to the information processing apparatus. The mode of appending the transfer environment information by the generation unit 204 may then be adjusted based on the determination result.

The transfer priority is determined to set a high priority for transfer environment information indicating a degraded transfer environment.

More specifically, when the transfer environment information associated with the target transfer module is determined to have a transfer priority higher than that of the previously appended transfer environment information, the previously appended transfer environment information is replaced with the transfer environment information associated with the target transfer module. In this case, when the previously appended transfer environment information also represents a degraded transfer environment of at least a predetermined level, both the two sets of transfer environment information may be included in the transmission information without such replacement. When the transfer environment information associated with the target transfer module is determined to have a transfer priority not higher than that of the previously appended transfer environment information, the transfer environment information associated with the target transfer module is not appended to the transmission information, and the transmission information with the previously appended transfer environment information is used as new transmission information. In this case, when the transfer environment information associated with the target transfer module also represents a degraded transfer environment of at least a predetermined level, both the two sets of transfer environment information may be included in the transmission information. Adjusting the mode of appending the transfer environment information in accordance with the transfer priority in this manner reduces the amount of transmission information delivered to the information processing apparatus 1.

Example 4

In this example, the priorities are determined for appending several items of information included in the transfer environment information (six items of information in the present embodiment, or namely information about the time at which the transmission information has been received (Rx Time Stamp), information indicating the time to transmit the transmission information (Tx Time Stamp), the MAC address (MAC Address), information indicating the intensity of the reception signal (RSSI of Data Receive), noise information (ED Scan Result), and information indicating the transmission power (Tx Power)) to the transmission information. The mode of appending each item of information to the transmission information by the generation unit 204 may be adjusted based on the determination result.

More specifically, the MAC address (MAC Address) and the information indicating the transmission power (Tx Power), among the above six items of information, are module internal information associated with the settings of the target transfer module. Such information normally does not vary. The need for appending such setting information to the transmission information after every transfer of measurement information to the information processing apparatus 1 is low, as compared with information indicating the time at which the transmission information has been received (Rx Time Stamp), information indicating the time to transmit the transmission information (Tx Time Stamp), and noise information (ED Scan Result), which are other items of module internal information associated with communication results of the transfer module. Thus, the setting information as module internal information is determined to have a lower priority of appending such information to the transmission information. Such low priority transfer environment information may not always be appended to the transmission information. The number of sets of prior transfer environment information to be appended to the transmission information may be narrowed down in this manner. This enables information to be collected efficiently, while preventing the amount of transmission information from increasing excessively.

The priority for appending information may be determined based on a criterion different from the above criterion. The number of sets of transfer environment information to be appended to the transmission information may be narrowed down based on the priority when the amount of transmission information reaches or exceeds a predetermined amount. When the amount of transmission information does not reach a predetermined amount, the transfer path has some remaining information capacity. In this case, sets of transfer environment information are appended to the transmission information without being narrowed down. This allows accurate information to be collected to improve the transfer environment.

Example 5

In this example, the mode of appending the transfer environment information by the generation unit 204 may be adjusted in accordance with the battery-powered state of the target transfer module, or specifically the remaining battery level. More specifically, when the remaining battery level is lower than a predetermined value, the transfer environment information is appended to the transmission information with a lower frequency. This reduces power consumption in the target transfer module, and maximizes the operable time of the target transfer module. In this case, transfer environment information indicating a degraded transfer environment may be appended to the transmission information, independently of the remaining battery level. When the target transfer module is powered using a power supply by an unlimited capacity, the transfer environment information may be appended to the transmission information with a higher frequency than when the target transfer module is powered by a battery.

In step S302, one or more of the modes of adjusting the information generating conditions in examples 1 to 5 described above may be implemented. When the processing in step S302 completes, the processing advances to steps S103 and S104, and then the relay process ends.

Third Embodiment

Figure 10:
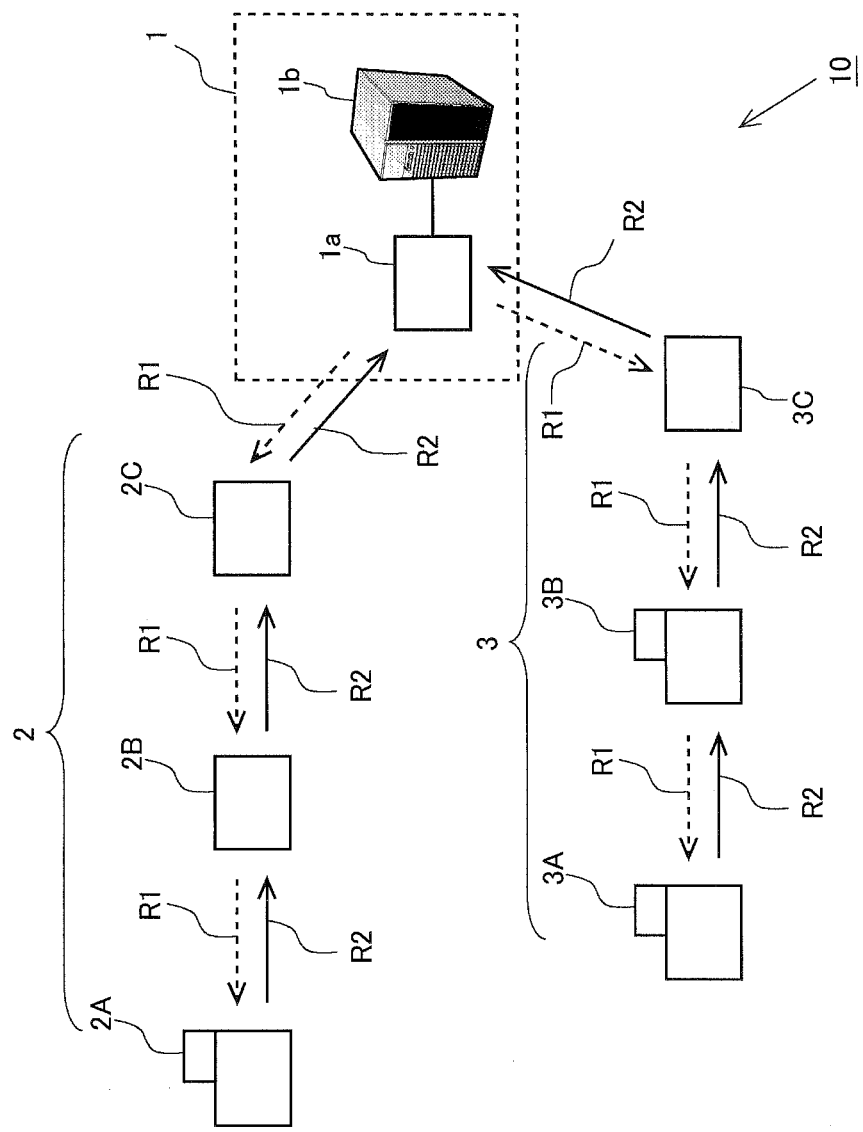
FIG. 10 is a schematic block showing a second network system according to another embodiment of the present invention.

A system 10 including transfer modules according to another embodiment of the present invention will now be described with reference to FIG. 10. Unlike the system 10 shown in FIG. 1, the system 10 in FIG. 10 performs pull-based information transfer. More specifically, the information processing apparatus 1 provides an instruction to perform measurement to the transfer modules 2A, 3A, and 3B incorporating sensors. The instruction to perform measurement is transmitted on the transfer paths indicated by arrows R1 drawn using broken lines in the figure. The transfer modules 2A, 3A, and 3B incorporating sensors each receive the instruction to perform measurement from the information processing apparatus 1, and then measure the temperature in accordance with the instruction, and transmit the resultant measurement information to the information processing apparatus 1 on the transfer paths indicated by arrows R2 drawn using solid lines.

In the present embodiment, when the measurement instruction is transferred on the transfer path R1 and measurement information (temperature data) obtained in response to the measurement instruction is transferred on the transfer path R2, the transfer modules that perform the relay process each append the transfer environment information associated with the transfer module during relaying to the transmission information including the measurement instruction and the measurement information. As a result, the information processing apparatus 1, which finally receives the measurement information, can determine a difference between the transfer environment of a forward path (transfer path R1) and the transfer environment of a return path (transfer path R2) in the pull-based information transfer, and can improve the transfer environment of each of these transfer paths. To accurately determine a difference between the transfer environment of the forward path and the transfer environment of the return path, the transfer environment information on the forward path and the transfer environment information on the return path may be obtained with the same criterion.

Fourth Embodiment

In the above embodiments, the transfer paths included in the system 10 are predefined paths. Unlike in the above embodiments, a target transfer module in the present embodiment autonomously detects its downstream transfer module to which transmission information is to be transmitted, and determines a transfer path based on the transfer environment during transfer of the transmission information. The technical idea of the present invention is also applicable to transfer modules included in such transfer paths that are determined variably, and improves the transfer environment of such transfer paths.

DESCRIPTION OF SYMBOLS 1 information processing apparatus
1b server
2, 2A, 2B, 2C, 2D, 3, 3A, 3B, 3C transfer module
10 network system

The invention claimed is:

1. An information transfer method for transferring transmission target information on a predetermined transfer path including an information processing apparatus and a transfer module, the transmission target information being transferred via the transfer module, the transmission target information being information to be processed by an information processing apparatus or information that has been processed by the information processing apparatus, the method comprising:
receiving predetermined transmission information including the transmission target information from an upstream transfer module located upstream from a target transfer module on the predetermined transfer path;
obtaining transfer environment information indicating a degree of influence placed by the target transfer module on an information transfer result of the transmission target information transferred to the information processing apparatus or an information transfer result of the transmission target information transferred from the information processing apparatus, the transfer environment information including at least one of module internal information or module surrounding information, the module internal information being information about a transfer environment for the transmission target information in the target transfer module, the module surrounding information being information about a transfer environment associated with a surrounding of the target transfer module excluding the upstream transfer module;

appending the transfer environment information obtained in the transfer environment information obtaining step to the predetermined transmission information received in the reception step to generate new predetermined transmission information; and transmitting the new predetermined transmission information generated in the generation step to a downstream transfer module located downstream from the target transfer module on the predetermined transfer path.

2. The information transfer method according to claim 1, wherein the transmission target information is information associated with measurement information obtained by a first sensor for measuring a surrounding environmental parameter, and the transmission target information is measurement information to be processed by the information processing apparatus or is processed-measurement information resulting from the measurement information processed by the information processing apparatus.

3. The information transfer method according to claim 2, wherein the predetermined transfer path includes the first sensor as a starting point and the information processing apparatus as an end point, the method further comprising:

transferring the measurement information obtained by the first sensor as a part of the predetermined transmission information.

4. The information transfer method according to claim 2, wherein the predetermined transfer path includes a forward path including the information processing apparatus as a starting point and the first sensor as an end point, and a return path including the first sensor as a starting point and the information processing apparatus as an end point, the method further comprising:

transmitting, to a forward-path downstream transfer module located downstream located downstream from the transfer module on the forward path, information including a measurement instruction provided from the information processing apparatus to the first sensor and forward-path transfer environment information appended to the information, the forward-path transfer environment information being the obtained transfer environment information on the forward path, and transmitting to a return-path downstream transfer module located downstream from the transfer module on the return path, new predetermined transmission information including the measurement information obtained by the first sensor in response to the measurement instruction and return-path transfer environment information that is the obtained transfer environment information on the return path appended to the measurement information, together with the forward-path transfer environment information appended on the forward path.

5. The information transfer method according to claim 4, wherein the forward-path transfer environment information on the forward path and the return-path transfer environment information on the return path are obtained in accordance with the same predetermined transfer environment criterion, and indicate a degree of influence placed by the transfer module on the information transfer result.

6. The information transfer method according to claim 2, further comprising:

appending measurement information obtained by a second sensor in addition to the transfer environment information to the predetermined transmission information, wherein the second sensor performs measurement in the transfer module.

7. The information transfer method according to claim 1, further comprising:

adjusting a frequency of appending the transfer environment information to the received predetermined transmission information in accordance with the obtained transfer environment information or in accordance with a change history of the obtained transfer environment information.

8. The information transfer method according to claim 1, further comprising:

detecting an abnormal transfer environment state that causes the transfer module to have at least a predetermined degree of influence on the information transfer result, when detecting the abnormal transfer environment state, appending the transfer environment information to the received predetermined transmission information to generate the new predetermined transmission information, and when detecting no abnormal transfer environment state, superimposing the transfer environment information associated with the transfer module on previously appended transfer environment information that is transfer environment information appended to the received predetermined transmission information to generate the new predetermined transmission information as one set of transfer environment information to be appended.

9. The information transfer method according to claim 1, further comprising:

determining a priority for transfer of previously appended transfer environment information to the information processing apparatus and determining a priority for transfer of the transfer environment information associated with the transfer module to the information processing apparatus, the previously appended transfer environment information being transfer environment information that has been appended to the received predetermined transmission information;

when determining that the transfer environment information is to be transferred with a higher priority than the previously appended transfer environment information, replacing the previously appended transfer environment information with the transfer environment information, and appending the transfer environment information to the predetermined transmission information to generate the new predetermined transmission information, and when determining that the transfer environment information is not to be transferred with a higher priority than the previously appended transfer environment information, using the predetermined transmission information to which the previously appended transfer environment information has been appended as the new predetermined transmission information without appending the transfer environment information to the predetermined transmission information.

10. The information transfer method according to claim 1, further comprising:
determining priorities for appending a plurality of sets of predetermined information included in the obtained transfer environment information to the predetermined transmission information; and
appending at least one or all of the plurality of sets of predetermined information included in the transfer environment information to the predetermined transmission information in accordance with the determined priorities.

11. The information transfer method according to claim 1, further comprising:
detecting a power supply state for driving the transfer module; and
adjusting a frequency of appending the transfer environment information to the received predetermined transmission information in accordance with the detected power supply state.

12. The information transfer method according to claim 1, wherein the module internal information includes at least one of reception time information indicating a time at which the predetermined transmission information is received by the transfer module, obtaining time information indicating a time at which the transfer environment information is obtained by the transfer module, or transmission time information indicating a time at which the new predetermined transmission information is to be transmitted by the transfer module.

13. The information transfer method according to claim 1, further comprising:
wirelessly receiving the predetermined transmission information from the upstream transfer module; and
wirelessly transmitting the new predetermined transmission information to the downstream transfer module.

14. The information transfer method according to claim 13, further comprising:
using a plurality of wireless channels; and
obtaining, for each of the plurality of wireless channels, noise information associated with the transfer module from a surrounding, the module surrounding information including the obtained noise information.

15. The information transfer method according to claim 14, further comprising:
adjusting timing at which the noise information is obtained in accordance with the transfer frequency of the transmission target information.

16. The information transfer method according to claim 13, further comprising:
calculating positional information indicating a position of an obstacle interfering with wireless transfer of the transmission target information based on previously appended transfer environment information that is transfer environment information appended to the received predetermined transmission information and on the module surrounding information for the transfer module; and
appending the transfer environment information and the calculated positional information indicating the position of the interference object to the predetermined transmission information.

17. A non-transitory computer readable storage medium storing an information transfer program enabling a transfer module for transferring transmission target information on a predetermined transfer path including an information processing apparatus to implement an information transfer method, the transmission target information being information to be processed by the information processing apparatus or information that has been processed by the information processing apparatus, the method comprising:
receiving predetermined transmission information including the transmission target information from an upstream transfer module located upstream from a target transfer module on the predetermined transfer path;
obtaining transfer environment information indicating a degree of influence placed by the target transfer module on an information transfer result of the transmission target information transferred to the information processing apparatus or an information transfer result of the transmission target information transferred from the information processing apparatus, the transfer environment information including at least one of module internal information or module surrounding information, the module internal information being information about a transfer environment for the transmission target information in the target transfer module, the module surrounding information being information about a transfer environment associated with a surrounding of the target transfer module excluding the upstream transfer module;
appending the transfer environment information obtained in the transfer environment information obtaining step to the predetermined transmission information received in the reception step to generate new predetermined transmission information; and
transmitting the new predetermined transmission information generated in the generation step to a downstream transfer module located downstream from the target transfer module on the predetermined transfer path.

18. The non-transitory computer readable storage medium according to claim 17, wherein
the transmission target information is information associated with measurement information obtained by a sensor for measuring a surrounding environmental parameter, and the transmission target information is measurement information to be processed by the information processing apparatus or is processed-measurement information resulting from the measurement information processed by the information processing apparatus.

* * * * *